W. C. CONANT.
SPEED CHANGING MECHANISM.
APPLICATION FILED MAR. 7, 1910.

987,430.

Patented Mar. 21, 1911.
7 SHEETS—SHEET 1.

Witnesses:
John Enders
Chas. H. Buell

Inventor:
William C. Conant
By Lynn, York, Lee, Christen & White
Attys

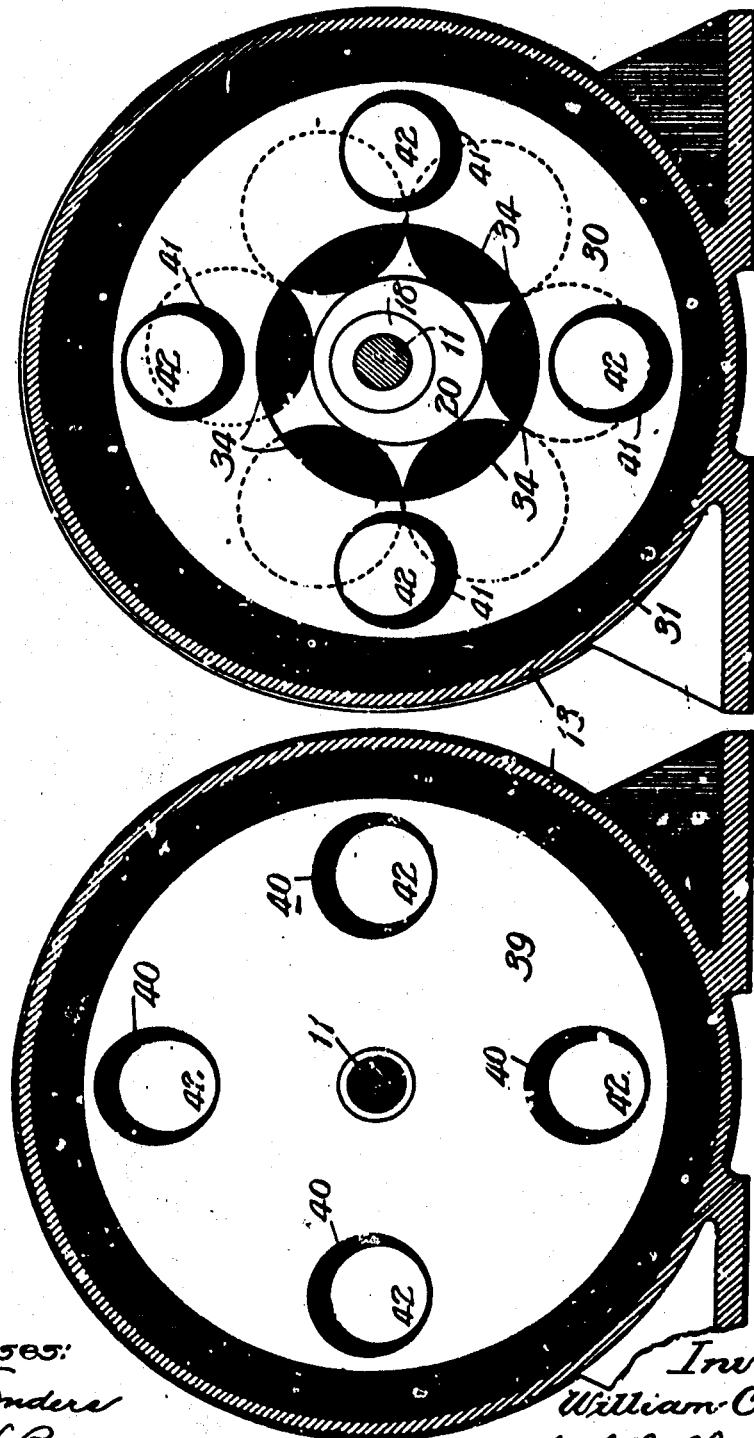

W. C. CONANT.
SPEED CHANGING MECHANISM.
APPLICATION FILED MAR. 7, 1910.
987,430.
Patented Mar. 21, 1911.
7 SHEETS—SHEET 3.
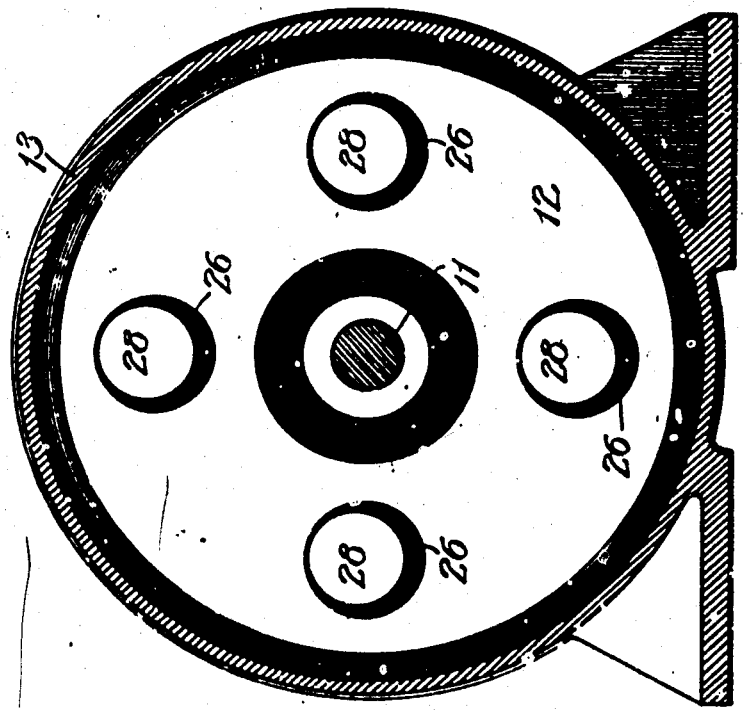
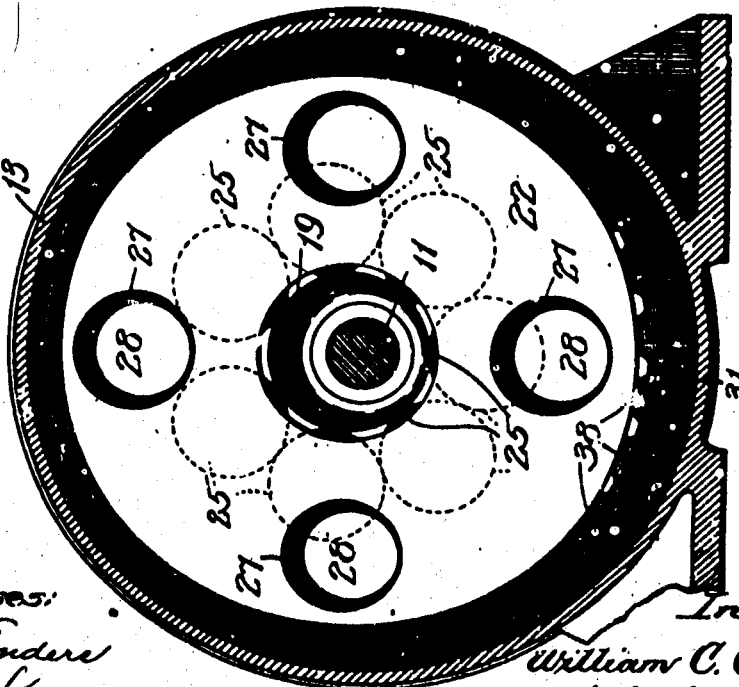
Witnesses:
John Enders
Chas. H. Powell
Inventor:
William C. Conant.
By Swanzwick, Lee, Chretien & Miles
Atty

W. C. CONANT.
SPEED CHANGING MECHANISM.
APPLICATION FILED MAR. 7, 1910.

987,430.

Patented Mar. 21, 1911.
7 SHEETS—SHEET 4.

Witnesses:
John Enders
Geo. H. Buell

Inventor:
William C. Conant.
By Dyrenforth, Lee, Chritton & Wiles
Attys.

W. C. CONANT.
SPEED CHANGING MECHANISM.
APPLICATION FILED MAR. 7, 1910.

987,430.

Patented Mar. 21, 1911.

7 SHEETS—SHEET 6.

Witnesses:
John Enders
Chas. H. Buell

Inventor:
William C. Conant
By Dyrenforth, Lee, Chritton & Wiles,
Attys.

W. C. CONANT.
SPEED CHANGING MECHANISM.
APPLICATION FILED MAR. 7, 1910.

987,430.

Patented Mar. 21, 1911.
7 SHEETS—SHEET 6.

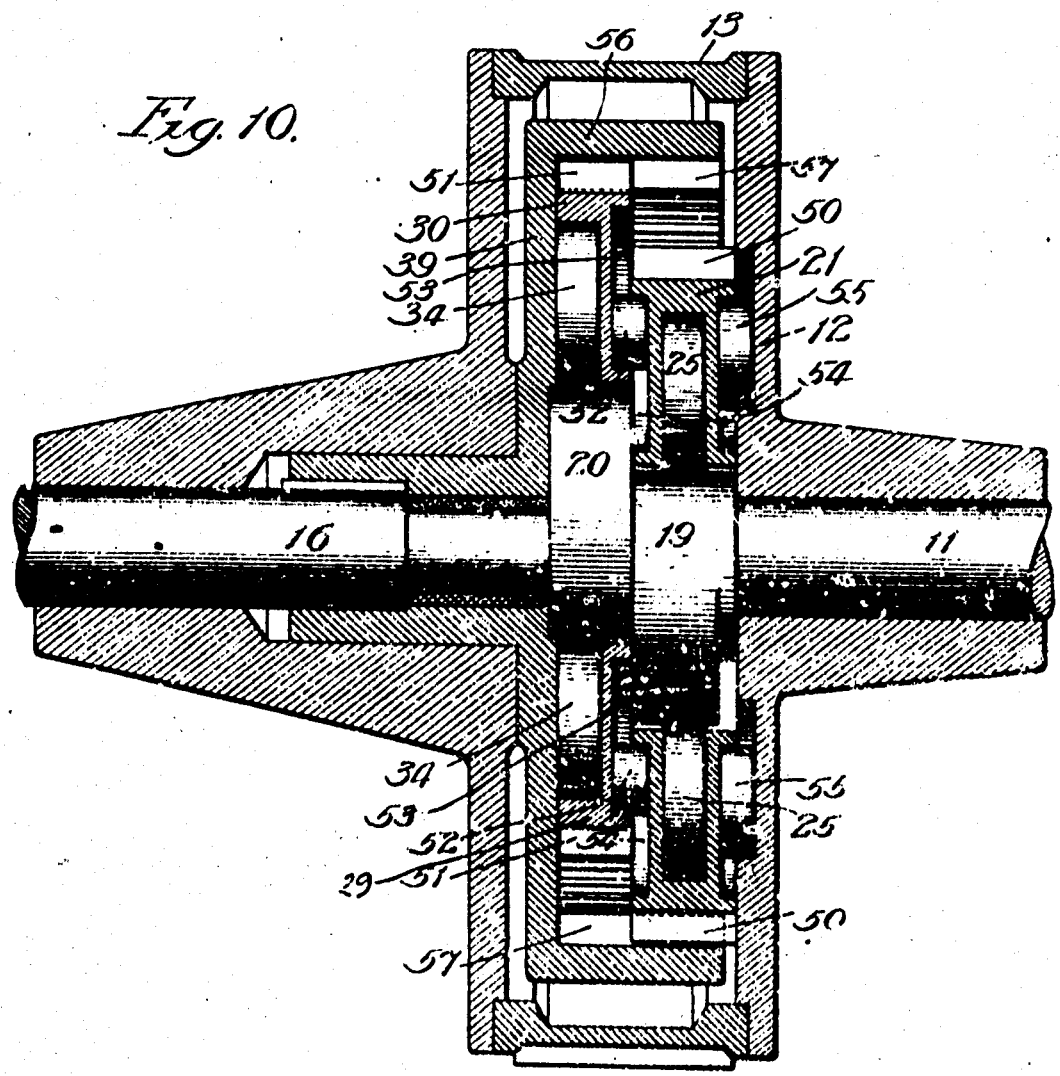

UNITED STATES PATENT OFFICE.

WILLIAM C. CONANT, OF OAK PARK, ILLINOIS.

SPEED-CHANGING MECHANISM.

987,430.

Specification of Letters Patent.   Patented Mar. 21, 1911.

Application filed March 7, 1910.   Serial No. 547,687.

*To all whom it may concern:*

Be it known that I, WILLIAM C. CONANT, a citizen of the United States, residing at Oak Park, in the county of Cook and State of Illinois, have invented a new and useful Improvement in Speed-Changing Mechanism, of which the following is a specification.

My invention relates, more particularly to improvements in speed-changers for effecting transmission of power from a drive to a driven member in line with each other, this type of device comprising, generally stated, a combination of intermeshing internal and external gears mounted to revolve with relation to each other, these gears being operatively connected with the drive and driven members and operating to transmit the power from the drive to the driven member to drive the latter at the desired speed.

My object is to provide certain improvements in speed-changers of the type above referred to and, more particularly, to those adapted for speed reduction, to the end of rendering their operation positive, and of effecting as nearly perfect balancing of the operative parts to permit high speed and to prevent undue wear and reduce noise in the operation of the device to the minimum; and, generally, to so improve devices of this type as to render them highly useful for the purposes for which they are provided.

My invention is illustrated in the accompanying drawings, in which—

Figure 1:
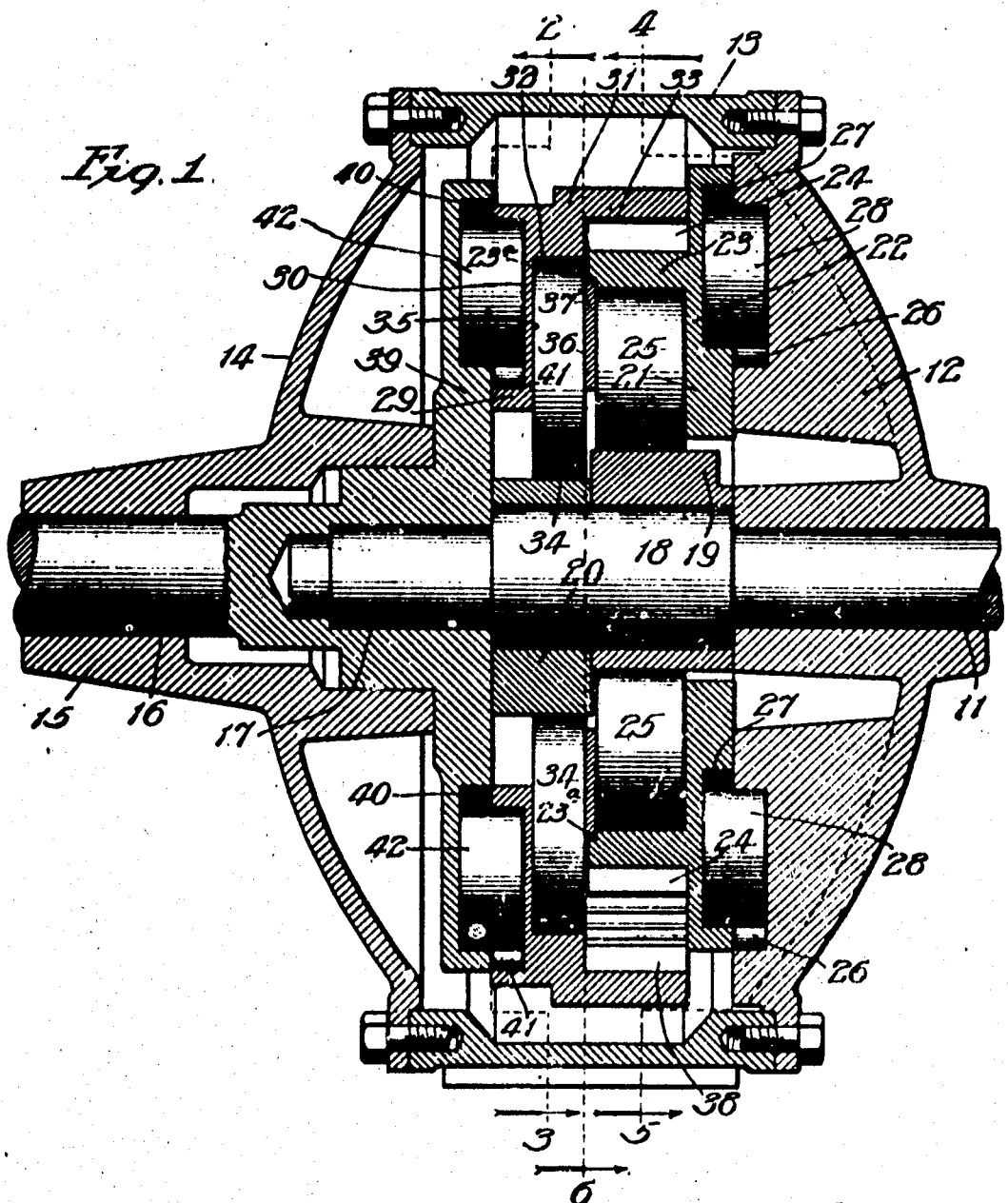
Figure 7:
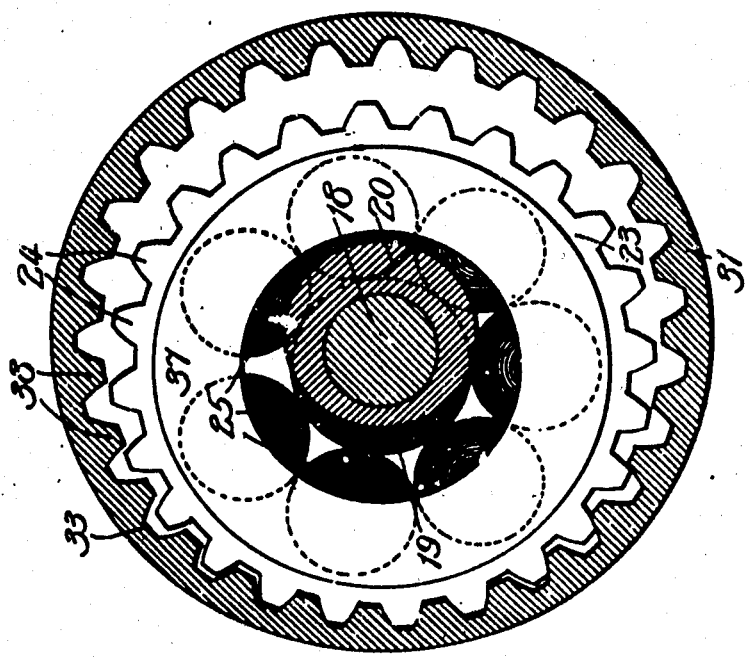
Figure 6:
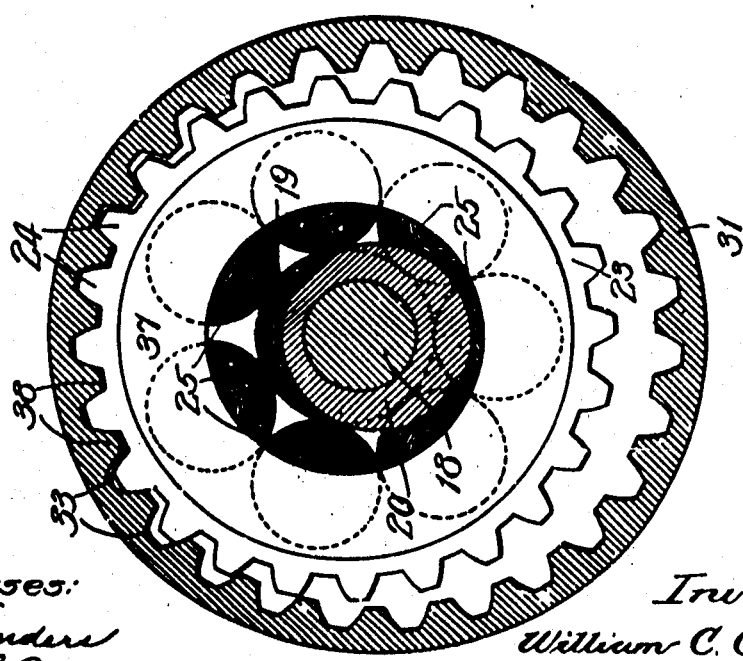
Figure 6:
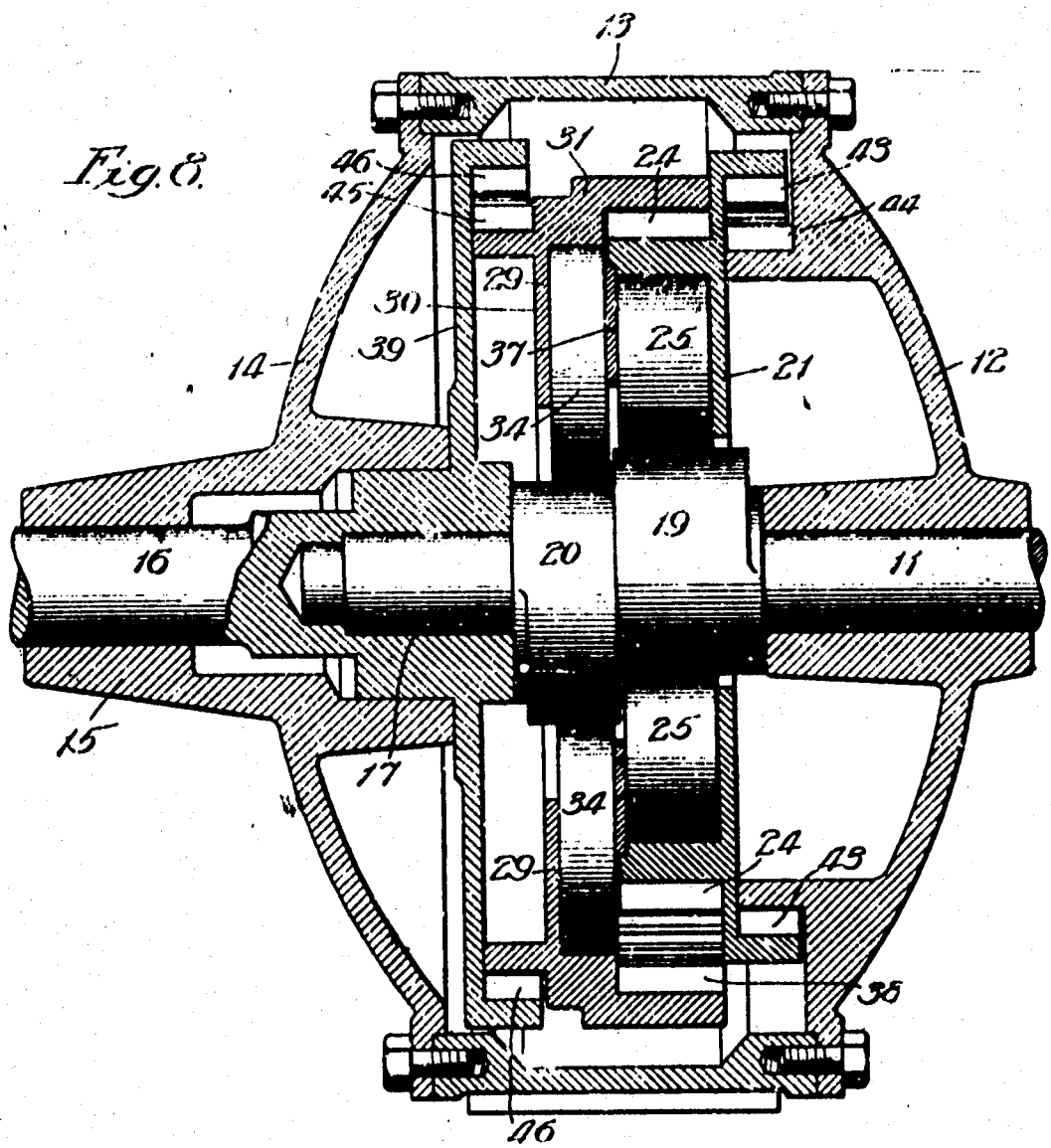

Figure 1 is a longitudinal sectional view of the preferred embodiment of my invention. Figs. 2, 3, 4, 5 and 6, are sections taken at the lines 2, 3, 4, 5 and 6, respectively, on Fig. 1, and viewed in the direction of the arrows. Fig. 7 is a view like Fig. 6 showing the parts in the position they assume when operated one-quarter of a revolution from the position represented in Fig. 6; and Figs. 8, 9 and 10, views like that of Fig. 1 of three other embodiments of my invention.

Referring to Figs. 1 to 7 inclusive, the drive-shaft, which may be the drive-shaft of an electric motor, or any other power device, is represented at 11 and is journaled intermediate its ends in a side-wall 12 of a stationary casing 13, the opposed wall 14 of which forms a journal-bearing 15 for the driven-shaft 16 which is in alinement with the drive-shaft 11. The inner end of the shaft 11 extends into the plane occupied by the side-wall 14 and is journaled in a socket 17 in the inner end of the shaft 16, whereby a rigid bearing for the inner end of the shaft 11 is afforded. The shaft 11 intermediate the side-wall 12 and the shaft 16, is of enlarged diameter, as indicated at 18, and has rigidly secured to it, as by forming integral therewith, a pair of diametrically-opposed eccentrics 19 and 20. Surrounding the eccentric 19 is a revoluble annular member 21 formed of a disk 22 and an annular flange 23 projecting laterally therefrom and provided on its periphery with gear-teeth 24. Confined between the inner circumference of the circular flange 23 and the outer periphery of the eccentric 19 is a series of rollers 25 which operate, when the eccentric 19 is rotated, to revolve the member 21 as hereinafter described.

Coöperating with the member 21 and the side-wall 12 of the casing are means operating to permit the member 21 to revolve through a circular path under the action of the eccentric 19, but prevent it from rotating upon its own axis, these means, in the construction illustrated, being as follows: The inner flat face of the wall 12 contains a circular series of recesses 26 of circular shape in cross-section arranged preferably equidistant from each other, as clearly illustrated in Fig. 5, four of these recesses being provided in the construction shown; and the adjacent face of the disk 22, which bears flatwise against the inner face of the wall 12, likewise contains similar recesses 27 which oppose the recesses 26. Confined in the pairs of recesses thus provided are rollers 28, the opposed faces of which are flat and bear against the bottom walls of the recesses 26 and 27. The recesses 26 and 27 of each pair overlap each other as represented clearly in Fig. 1 and are of a diameter sufficient to permit the member 21 to freely revolve about the shaft 11, the rollers 28 thus loosely confined in these opposed recesses affording roller-keys between the member 21 and casing-wall 12 for preventing said member from rotating when the shaft 11 is operated.

Surrounding the eccentric 20 is a gyratory annular member 29 formed of a disk 30 and an angle-shaped flange 31 projecting laterally therefrom and affording two annular internal surfaces 32 and 33, the latter overlapping the gear 24. Confined between the annular surface 32 and the periphery of the eccentric 20 is a series of rollers 34 which operate, when the shaft 11 is rotated, to revolve the member 29 about this shaft, these rollers being confined between a flat annular face 35 of the disk 30 and the face 36 of a ring 37 confined in an annular groove 23ª in a face of the flange 23. The internal annular surface 33 of the flange 31 is provided with gear-teeth 38 which mesh with the gear 24 as illustrated in Fig. 6.

The driven shaft 16 carries on its inner end a disk-shaped head 39 containing in its inner face an annular series of recesses 40 as described of the side-wall 12, these recesses being opposed by recesses 41 in the outer face of the disk 30. Confined in the pairs of recesses 40 and 41 thus provided are rollers 42 which operate to afford roller-key connection between the driven-shaft 16 and the member 29, to permit the latter to gyrate and transmit its rotary motion, produced as hereinafter described, to the driven-shaft for rotating it.

The operation of the device is as follows: Rotation of the drive-shaft 11 produces rotation of the eccentrics 19 and 20, which latter, by reason of the provision of the roller-bearings 25 and 34, causes the members 21 and 29 to revolve, the internal and external gears 38 and 24, respectively, provided on the members 21 and 29, being so proportioned that some portion of the gear 24 will always be in mesh with the gear 38 during the revolving of the member 21 within the member 29, as illustrated in Figs. 6 and 7, the member 21 being held against rotation on its own axis by the stationary casing 13 through the medium of the rollers 28 engaging the curved walls of the recesses 26 and 27, but being free to revolve about the shaft 11 and traveling in a circular path upon the internal gear 38, causing the latter to rotate upon its own axis with the result of communicating rotary movement to the disk 39 and driven-shaft 16 through the medium of the rollers 42, the speed of movement of the driven-shaft depending upon the relative diameters of the internal and external gears and the number of teeth provided thereon.

The construction illustrated in Fig. 8 is like that disclosed in the preceding figures, excepting as to the means connecting the member 21 to the casing 13, and the member 29 to the driven-shaft 16, the means employed in the construction shown in Fig. 8 being as follows: The member 21 in addition to the external gear 24, carries an internal gear 43 on its opposed face which meshes with an external gear 44 on the end-wall 12 of the casing 13, the gears 43 and 44 being so proportioned that the gear 43 will be in mesh at all times, during its revolutions, with the gear 44. The member 29 in addition to its internal gear 38, carries on its opposite face an external gear 45 which meshes with an internal gear 46 on the disk 39, the gears 45 and 46 being so proportioned as to cause the gear 46 to be in mesh with the gear 45 at all times during the revolutions of the latter. It will be understood from the foregoing description that when the drive-shaft 11 is operated, the member 21 is caused to gyrate, and its gear 24 thus moves upon the internal gear 38 with the result of causing the latter to rotate as it is revolved by the eccentric 20, the rotary movement thus produced in the gear 45 being communicated to the driven-shaft 16 through the medium of the gears 45 and 46. The gears 43 and 44 serve to carry the reaction of the members 21 and 29 to the fulcrum 12 for effecting rotation of the shaft 16.

An obvious modification of the structure illustrated in Fig. 8 may be made by substituting for the gears 43 and 44 roller-key connections such as those illustrated at 28 in Fig. 1, or substituting for the gears 45 and 46 the roller-keys 42.

Figure 9:
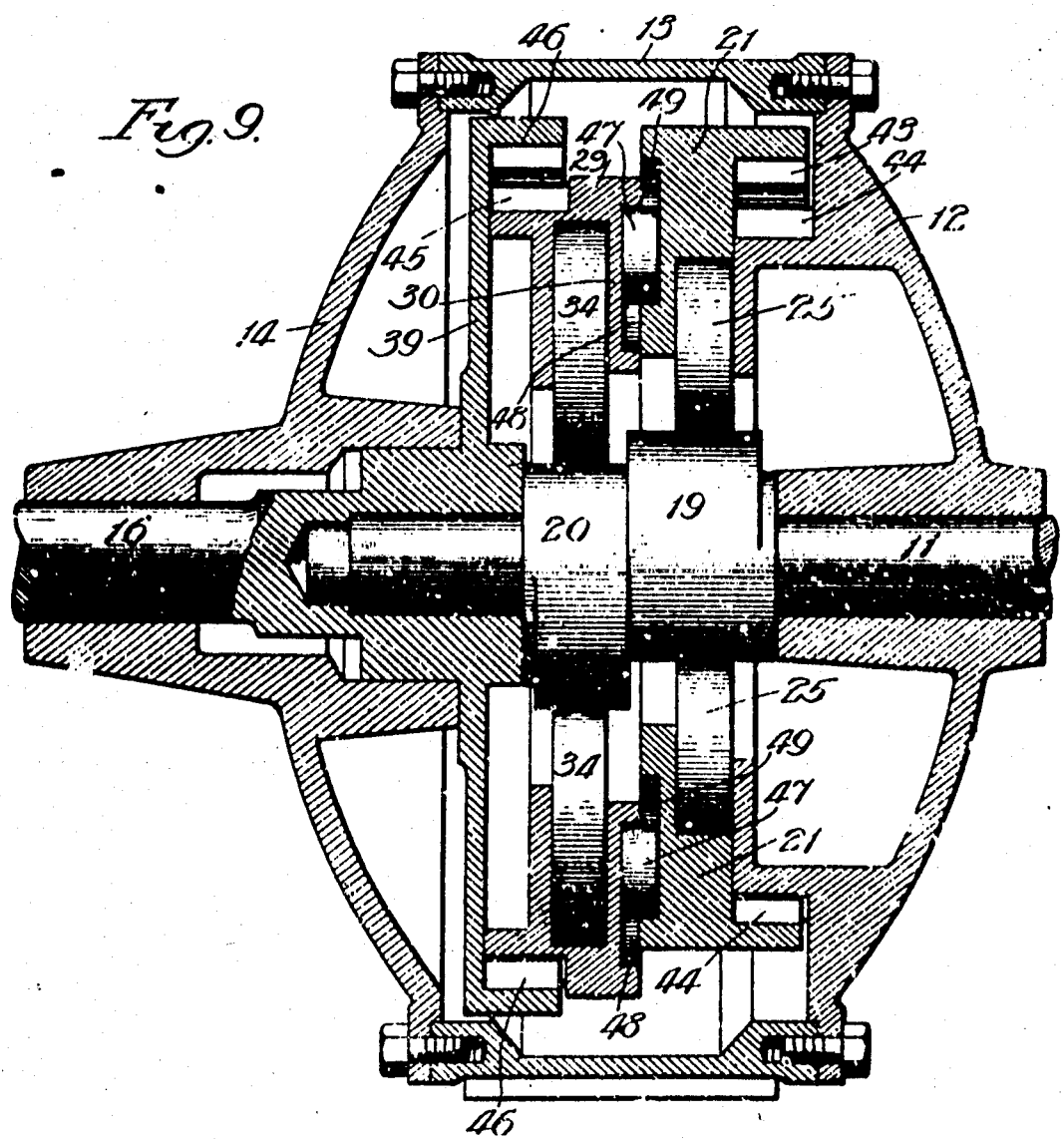

The construction illustrated in Fig. 9 is the same as that shown in Fig. 8, excepting as to the connections between the members 21 and 29. In the construction shown in Fig. 9 the members 21 and 29 instead of being provided with gear connections as described of the constructions illustrated in the preceding figures, have roller-key connections with each other, these roller-keys being represented at 47 and confined in opposed circular recesses 48 and 49 arranged in annular series in opposed faces of these members respectively, as described of the roller-key connections of the member 21 with the end-wall 12 of the casing, and the member 29 and the driven-shaft 16 of the construction illustrated in Fig. 1, the recesses 48 and 49 of each pair overlapping and being of sufficient diameter, as illustrated, to permit the members 21 and 29 to gyrate through their circular paths under the action of the eccentrics 19 and 20, the member 29 operating in its gyratory movement to rotate the gear 46 and the driven-shaft 16.

In the construction illustrated in Fig. 10, the members 21 and 29 carry external gears 50 and 51 respectively, and are operatively connected together through the medium of roller-keys 52 confined in opposed recesses 53 and 54 in the members 29 and 21, respectively, as described of the construction illustrated in Fig. 9, the member 21 being operatively connected with the casing-wall 12 through the medium of roller-keys 55, as described of the construction in Fig. 1. The disk-head 39 of the driven-shaft 16 is provided with a laterally extending annular flange 56 which is provided about its annular inner surface with gear-teeth 57 with which the gears 50 and 51 mesh. The effect of driving the eccentrics 19 and 20 is to cause the members 21 and 29 to revolve about the shaft 11 in engagement with the gear 57, the said members by being held against rotation thus operating to rotate this gear 57 and consequently the driven-shaft 16 as these external gears travel about the internal gear 57 and in contact therewith.

It will be noted from the foregoing description that in each of the constructions illustrated a pair of revoluble gear-members operated by diametrically-opposed eccentrics on the drive-shaft are provided for transmitting power from this shaft to the driven-shaft, and thus the weight on opposite sides of the drive-shaft is maintained equal at all times, and as nearly perfect counterbalancing as possible is produced, the throw of the coöperating eccentrics 19 and 20 being so proportioned with relation to the weights of the gear-members 21 and 29 as to cause the weight on opposite sides of the drive-shaft to be counterbalanced. Thus in the constructions illustrated in Figs. 1 to 9 inclusive, the gear-member 21 being heavier than the member 29, the eccentric is so constructed, as illustrated, as to produce a throw of the member 21 so proportioned with relation to the throw produced by the eccentric 20 as to effect counterbalancing of these members upon the driveshaft 11 at all times, and in the construction illustrated in Fig. 10, the weight of the members 21 and 29 being equal, the eccentrics 19 and 20 are so constructed as to effect equal throws. It will also be noted that in each of the constructions illustrated, the drag of the load on the driven-shaft due to the resistance afforded by the load, is communicated from one revoluble gear-member to the other and that the combined reaction of these gear members is communicated to the side-wall 12 forming the fulcrum, when the mechanism is operated as described.

Another feature of advantage in mechanism constructed in accordance with my invention is that of providing bearings for the inner end of the drive-shaft 11 disposed on opposite sides of the revolving gear-members 21 and 29 actuated thereby, this feature serving to afford to the shaft the desired bearing for resisting pressure exerted against it during operation of the mechanism.

The roller-keys provided in the constructions illustrated in Figs. 1 to 7 inclusive and 9 and 10, as the means for connecting together the gear-members and the latter with the casing and driven-shaft, operate to exert the minimum degree of friction as they roll against the curved walls of the recesses of each pair in which they are confined, the rollers being prevented from occupying a position in which their axes of rotation, or the surfaces of contact, are not parallel by reason of the broad bearing-surfaces provided at their ends, due to their large diameter with relation to the length against which the faces of the members coöperating therewith bear.

By not journaling the rollers 25 and 34 in the members 21 and 29, but leaving them to travel under the action of the rotating eccentrics, the members may be driven from the eccentrics with comparatively slight wear upon the movable parts, and by housing them between the flat faces of the members 21 and 29 and the faces of the ring 37 the moving of these rollers to a position in which their axes of rotation, or the surfaces of contact are not parallel, is prevented.

All of the constructions illustrated are capable of being used to rotate a driven-member faster than the drive by making the shaft 16 the drive-shaft and the shaft 11 the driven-shaft, as will be readily understood in the art. Furthermore, if it be desired that the casing be the driven-member, it may be provided in the form of a belt-pulley or gear, and be rotated by applying the driving power through either of the shafts 11 or 16, in which case the shaft not receiving the driving power should be anchored.

What I claim as new, and desire to secure by Letters Patent, is:—

1. In speed-changing mechanism, the combination of revoluble gear-members movable with relation to each other and operated from a common source against the resistance of a load and operatively connected together to cause one of said gear-members to react upon the other, a fulcrum, and means operatively connecting one of said gear-members with said fulcrum to exert against the latter the combined reaction of the gears.

2. In speed-changing mechanism, the combination of gear-members movable with relation to each other and operated from a common source against the resistance of a load and operatively connected together to cause one of said gear-members to react upon the other, opposed eccentrics operating to revolve said gear-members, a fulcrum, and means operatively connecting one of said gear-members with said fulcrum to exert against the latter the combined reaction of the gears.

3. In speed-changing mechanism, the combination of gear-members forming gear-mechanism and operatively connected together to cause the reaction of one gear-member to be transmitted to the other thereof, a rotatable member operatively connected with said gear-mechanism to rotate therewith, a fulcrum, means operating to revolve said gears, and means operatively connecting the other of said gear-members with said fulcrum to carry the combined reaction of the gears to said fulcrum.

4. In speed-changing mechanism, the combination of gear-members operatively connected together to cause the reaction of one of said gear-members to be transmitted to the other thereof, a rotatable member operatively connected with said gear-members to rotate therewith, a fulcrum, opposed eccentrics operating to revolve said gears, and means operatively connecting the other of said gear-members with said fulcrum to carry the combined reaction of the gears to said fulcrum.

5. In speed-changing mechanism, the combination with driving and driven bodies, of gear-members movable with relation to each other and operated from a common source and operatively connected together to cause the reaction of one of said gear-members to be transmitted to the other thereof, means rotatable with one of said bodies for revolving said gear-members, a fulcrum, means operatively connecting one of said gear-members with said fulcrum to carry the combined reaction of the two gears to said fulcrum, and means for rotating the other of said bodies from said gear mechanism.

6. In speed-changing mechanism, the combination with driving and driven bodies, of gear-members operatively connected together to cause the reaction of one of said gear-members to be transmitted to the other thereof, opposed eccentrics rotatable with one of said bodies and operating to revolve said gear-members, a fulcrum, means operatively connecting one of said gear-members with said fulcrum to carry the combined reaction of the two gears to said fulcrum, and means for rotating the other of said bodies from said gear mechanism.

7. In speed-changing mechanism, the combination with driving and driven bodies, of gear-members operatively connected together to cause the reaction of one of said gear-members to be transmitted to the other thereof, means rotatable with said driving body for revolving said gear-members, a fulcrum, means operatively connecting one of said gear-members with said fulcrum to carry the combined reaction of the two gears to said fulcrum, and means for rotating said driven body from said gear-mechanism.

8. In speed-changing mechanism, the combination with driving and driven bodies, of gear-members operatively connected together to cause the reaction of one of said gear-members to be transmitted to the other thereof, opposed eccentrics rotatable with said driving body operating to revolve said gear-members, a fulcrum, means operatively connecting one of said gear-members with said fulcrum to carry the combined reaction of the two gears to said fulcrum, and means for rotating said driven body from said gear mechanism.

9. In speed-changing mechanism, the combination with revoluble gear-members operatively connected together to cause the reaction of one of said gear-members to be transmitted to the other thereof, of a casing in which said gear-members are located, a rotary member, means interposed between one of said gear-members and said casing for operatively connecting them together and permitting the gear-member so connected to revolve, and means connecting the other of said gear-members with said rotatable member, all so constructed and arranged as to cause the reaction of one gear to be transmitted to the other and the combined reaction of both gears to be exerted against the casing.

10. In speed-changing mechanism, the combination with gear-members operatively connected together to cause the reaction of one of said gear-members to be transmitted to the other thereof, of a casing in which said gear-members are located forming a fulcrum, rotatable eccentrics operating to revolve said gear-members, a rotary member, means interposed between one of said gear-members and said casing for operatively connecting them together and permitting the gear-member so connected to revolve, and means connecting the other of said gear-members to said rotatable member, all so constructed and arranged as to cause the reaction of one gear to be transmitted to the other and the combined reaction of both gears to be exerted against the fulcrum.

11. In speed-changing mechanism, the combination with driving and driven shafts, of gear-members operatively connected together to cause the reaction of one of said gear-members to be transmitted to the other thereof, a casing in which said gear-members are located forming a fulcrum, means carried by one of said shafts for revolving said gear-members, means interposed between one of said gear-members and said casing for operatively connecting them together and permitting the gear-member so connected to revolve, and means connecting the other of said gear-members to the other of said shafts to be rotatable therewith, all so constructed and arranged as to cause the reaction of one gear to be transmitted to the other and the combined reaction of both gears to be exerted against the fulcrum.

12. The combination with driving and driven shafts, of a stationary casing forming a fulcrum, gear-members in said casing being operatively connected together to cause the reaction of one of said gear-members to be transmitted to the other thereof, means rotatable with one of said shafts for revolving said gear-members, means operatively connecting one of said gear-members with said casing for permitting said gear-member to revolve but not rotate, and means operatively connecting said gear-mechanism with the other of said shafts for transmitting to the latter rotary motion, the whole being constructed and arranged as to cause the reaction of one gear to be transmitted to the other and the combined reaction of both gears to be exerted against the fulcrum.

13. The combination with driving and driven bodies, of a stationary casing, intermeshing gear-members in said casing, means rotatable with one of said bodies for revolving said gear-members, means operatively connecting one of said gear-members with said casing, and means operatively connecting the other of said gear-members to the other of said bodies for transmitting to the latter rotary motion.

14. The combination with driving and driven shafts, of a stationary casing in which the inner ends of said shafts are journaled, gear-members in said casing, said gear-members being operatively connected together to cause the reaction of one of said gear-members to be transmitted to the other thereof, means rotatable with one of said shafts for revolving said gear-members, means operatively connecting one of said gear-members with said casing to carry the combined reaction of the two gears to said casing, and means for rotating the other of said shafts from said gear-members.

15. In speed-changing mechanism, the combination of revoluble intermeshing gears operating against the resistance of a load, a fulcrum, and means operatively connecting one of said gear-members with said fulcrum, the whole being so constructed and arranged as to cause the reaction of one gear to be transmitted to the other, and the combined reaction of both gears to be exerted against the fulcrum.

16. In speed-changing mechanism, the combination of intermeshing gear-members operating against the resistance of a load, opposed eccentrics operating to revolve said gear-members, a fulcrum, and means operatively connecting one of said gear-members with said fulcrum, the whole being so constructed and arranged as to cause the reaction of one gear to be transmitted to the other and the combined reaction of both gears to be exerted against the fulcrum.

17. In speed-changing mechanism, the combination with driving and driven bodies, of intermeshing gear-members, means rotatable with one of said bodies for revolving said gear-members, means operatively connecting one of said gear-members with said fulcrum, and means for rotating the other of said bodies from said gear mechanism, the whole being so constructed and arranged as to cause the reaction of one gear to be transmitted to the other and the combined reaction of both gears to be exerted against the fulcrum.

18. In speed-changing mechanism, the combination with driving and driven bodies, of intermeshing gear-members, means rotatable with said driving-body for revolving said gear-members, a fulcrum, means operatively connecting one of said gear-members with said fulcrum, and means for rotating said driven body from said gear-mechanism, the whole being so constructed and arranged as to cause the reaction of one gear to be transmitted to the other and the combined reaction of both gears to be exerted against the fulcrum.

19. The combination with driving and driven bodies, of a stationary casing, intermeshing gear-members in said casing, eccentrics rotatable with one of said bodies for revolving said gear-members, means operatively connecting one of said gear-members with said casing and means operatively connecting the other of said gear-members with the other of said bodies for transmitting to the latter rotary motion, the whole being so constructed and arranged as to cause the reaction of one gear to be transmitted to the other and the combined reaction of both gears to be exerted against the casing.

20. In speed-changing mechanism, the combination with driving and driven bodies, of gear-members operatively connected together to cause the reaction of one of said gear-members to be transmitted to the other thereof, means rotatable with said driving body for revolving said gear-members, a fulcrum, roller-keys operatively connecting one of said gear-members with said fulcrum to carry the combined reaction of the two gears to said fulcrum, and roller-keys operatively connecting the other of said gear-members with said driven body.

21. In speed-changing mechanism, the combination with driving and driven bodies, of a pair of gear-members containing circular recesses, means rotatable with one of said bodies for revolving said gear-members, a fulcrum-member for one of said gear-members containing recesses opposed to the recesses of the adjacent one of said gear-members, a head carried by the other of said bodies and containing recesses opposing the recesses in the one of the gear-members adjacent thereto, and roller-keys of less diameter than said recesses confined in the opposed pairs thereof to roll at their curved surfaces against the walls of the recesses in which they are confined during the revolving of said gear-members.

22. In speed-changing mechanism, the combination with driving and driven shafts, opposed eccentrics on said driving shaft, an internal gear and an external gear surrounding said eccentrics and meshing with each other, a fulcrum, means operatively connecting one of said gear-members with said driven shaft for transmitting rotary motion thereto, and means operatively connecting the other of said gears to said fulcrum, for the purpose set forth.

23. In speed-changing mechanism, the combination with gear-members operating against the resistance of a load and operatively connected together to cause the reaction of one of said gear-members to be transmitted to the other thereof, opposed rotatable eccentrics, an annular series of rollers confined between the peripheries of said eccentrics and the inner annular surfaces of said gear-members and operating to revolve said gear-members when the eccentrics are rotated, a fulcrum, and means operatively connecting one of said gear-members with said fulcrum to exert against the latter the combined reaction of the gears, the whole being constructed and arranged to maintain said rollers in alinement.

24. In speed-changing mechanism, the combination with driving and driven bodies, of gear-members operatively connected together to cause the reaction of one of said gear-members to be transmitted to the other thereof, opposed eccentrics rotatable with one of said bodies and extending through said gear-members, an annular series of rollers confined between the peripheries of said eccentrics and the inner annular surfaces of said gear-members and operating to revolve said gear-members when said eccentrics are rotated, means engaging with the opposed faces of said rollers for maintaining them in alinement, a fulcrum, means operatively connecting one of said gear-members with said fulcrum to carry the combined reaction of the two gears to said fulcrum, and means for rotating the other of said bodies from said gear mechanism.

25. In power-transmission mechanism, the combination of a pair of members containing opposed recesses, one of which has revoluble movement with relation to the other, and roller-keys confined in said recesses, the diameter of said rollers being less than the diameter of said recesses, for the purpose set forth.

26. In power-transmission mechanism, the combination of a pair of members containing opposed circular recesses and supported to revolve with relation to each other, and rollers confined in said recesses, the diameters of said rollers being less than the diameters of said recesses, for the purpose set forth.

27. In power-transmission mechanism, the combination of a pair of members containing opposed recesses and supported to revolve with relation to each other, and rollers confined in said recesses, said rollers being of less diameter than said recesses and having flat faces adapted to bear against the bottom of said recesses with which they coöperate, for the purpose set forth.

WILLIAM C. CONANT.

In presence of—
W. B. DAVIES,
R. A. SCHAEFER.